Aug. 6, 1940.  H. H. RODIN  2,210,008
AUTOMATIC TOW BAR
Filed Aug. 9, 1939  2 Sheets-Sheet 1
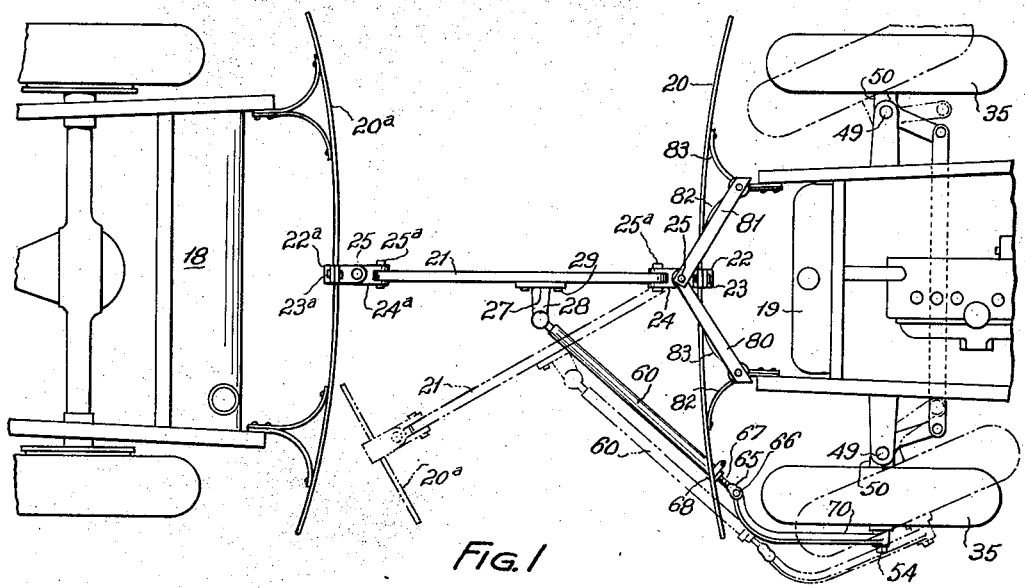
Fig. 1
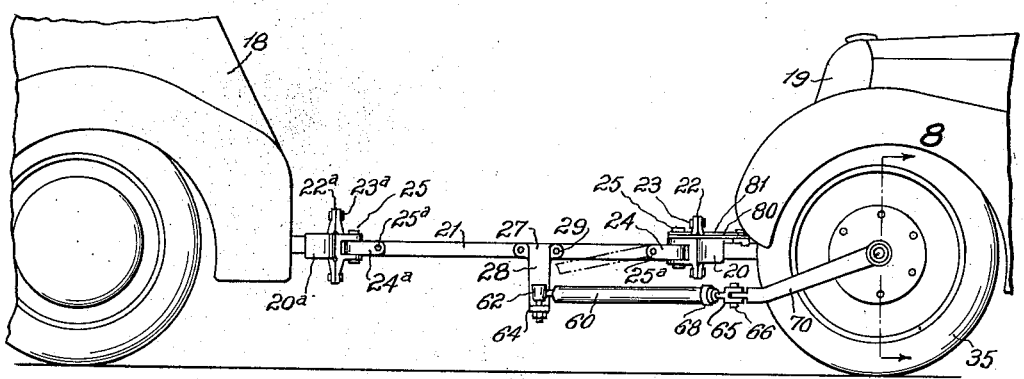
Fig. 2
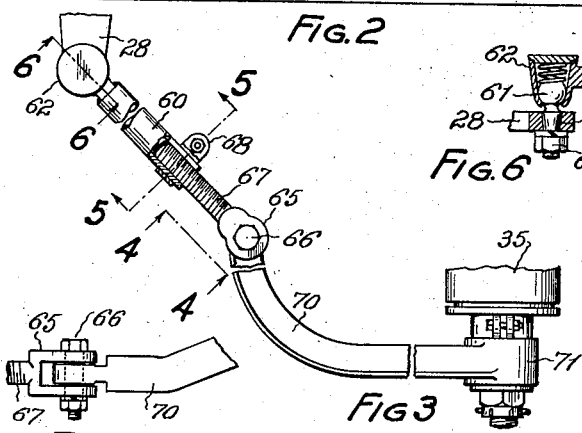
Fig. 6
Fig. 5
Fig. 3
Fig. 4
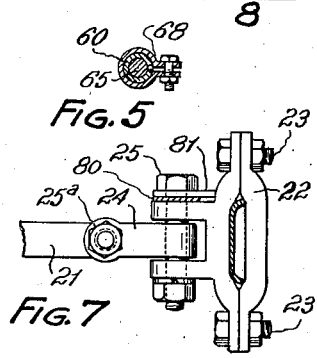
Fig. 7
INVENTOR:
HARRY H. RODIN
BY Morton S Brockman
ATTORNEY

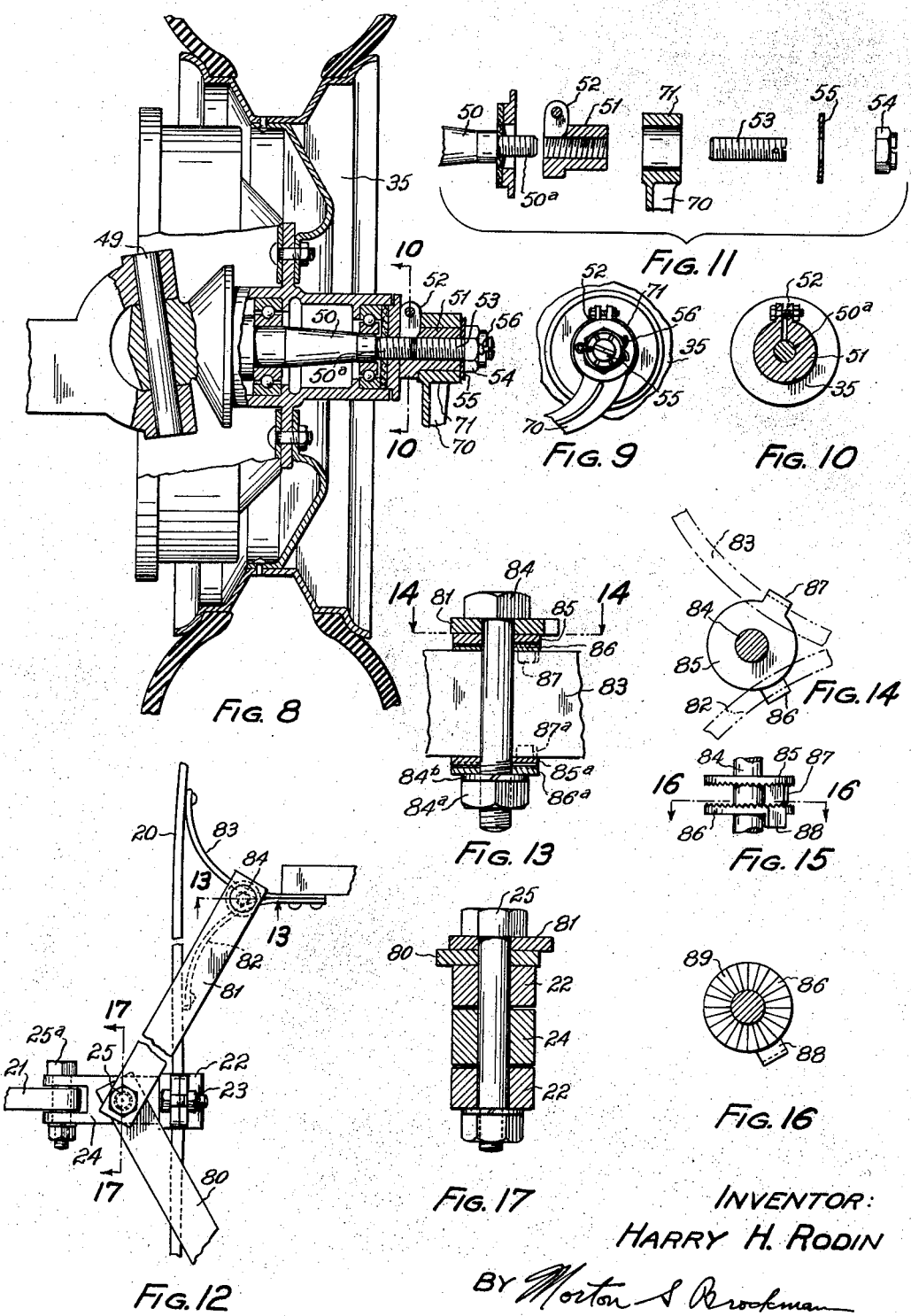

Patented Aug. 6, 1940

2,210,008

UNITED STATES PATENT OFFICE 2,210,008

AUTOMATIC TOW BAR

Harry H. Rodin, Cleveland, Ohio, assignor of one-half to August Jeney, Jr., Cleveland, Ohio Application August 9, 1939, Serial No. 289,221

7 Claims. (Cl. 280—33.55)

This invention relates to automobile towing devices and particularly to such links or draw-bars which are coupled with automatic steering mechanism attached to the car being towed. This invention is a modification of the automatic towing and steering device referred to in my co-pending application filed September 20, 1938, Serial No. 230,805 and titled Universal automatic hitch.

The primary object of the instant invention is to provide a device which is compact and therefore easy to transport; which is made of standard parts and fittings and therefore is economical to manufacture, assemble or repair.

Another object is to provide a device which may be quickly and easily installed or attached to readily accessible parts of an automobile, such as respective front and rear bumpers of automobiles in tandem; and which may be handled and operated by one person who need not be particularly skilled in the use of such appliances.

A further object of the invention is to provide a one-man tow-bar with an automatic steering mechanism which engages the outside or free end of a stub axle on the front wheel of the car being towed, and which is safe, fool-proof and secure in operation.

Still another object is to create a device of the type mentioned which is more or less universal in its application; that is, one which is easily adjustable or made suitable for engagement and use with all current standard makes of automobiles.

These and other objects and features of the invention will become apparent from a study of the following description and claims together with the accompanying drawings in which like parts are designated by like reference characters and wherein:

Figure 1 is a plan view of the automatic tow-bar connecting two automobiles in tandem;

Figure 2 is a side view of the same;

Figure 3 is an enlarged view of the steering element;

Figure 4 is an elevational view of a part of the steering element taken along the lines 4—4 of the Figure 3;

Figure 5 is a vertical section of the steering element taken along the lines 5—5 of the Figure 3;

Figure 6 is a vertical section of the steering element taken along the lines 6—6 of the Figure 3;

Figure 7 is an enlarged side view of the bumper clamps on each end of the tow-bar;

Figure 8 is an enlarged vertical, sectional view of an automobile front wheel taken along the lines 8—8 of the Figure 2;

Figure 9 is a side elevation of the wheel hub and axle indicated in the Figure 8;

Figure 10 is a vertical section taken along the lines 10—10 of the Figure 8;

Figure 11 is an exploded view of the stub axle of Figure 8 and parts of the steering element connected thereto;

Figure 12 is an enlarged plan view of portions of a front bumper, draw-bar and brace members connected together;

Figure 13 is a vertical section taken along the lines 13—13 of the Figure 12 showing means of connecting a brace member to the bumper bracket;

Figure 14 is a plan view of a brace member and bumper bracket connecting means taken along the lines 14—14 of the Figure 13;

Figure 15 is an elevation of the top connecting means shown in the Figure 14 with co-related parts slightly separated;

Figure 16 is a plan view of one of the corrugated washers of the connecting means taken along the lines 16—16 of the Figure 15; and Figure 17 is a vertical section of a bumper clamp pivot member taken along the lines 17—17 of the Figure 12.

This invention consists broadly of a draw-bar member, a flexible steering arm member, and means for attaching the members together and also for coupling the members to the two automobiles. In the drawings, the front or towing vehicle is designated by the character 18 and the rear or towed automobile is designated by the character 19.

The draw-bar member consists of a rather substantial bar or beam 21 to which there is flexibly attached conventional clamps 22 and 22a. The clamp 22 engages the central portion of the front bumper 20 on the rear vehicle 19, and the clamp 22a similarly engages the rear bumper 20a on the front vehicle 18. These clamps are securely retained to their respective bumpers by the nuts and bolts respectively indicated by the characters 23 and 23a.

At a point approximately in the center of the beam 21, there is mounted on the side of the beam an L-shaped bracket 27. This bracket 27 extends downward a few inches to a level slightly below the bottom edge of the bumper 20. It also projects sidewise to the left about six or eight inches and terminates in a small horizontal ledge or step 28, which step is drilled so as to be suitable for mounting thereon the ball 61 of a swivel steering connector hereinafter described in detail. The bracket 27 is suitably provided with nuts and bolts 29 for convenient mounting on the side of the beam 21.

The flexible steering arm or link member consists of a length of metal tube hereinafter referred to as the guide arm 60. Attached to the inner end of the guide arm 60 there is a socket 62 that contains therein a conventional ball 61. The ball 61 being provided with a threaded and shouldered base 63 and the nut 64 for suitable mounting on the step 28 of the bracket 27.

The outer end of the guide arm 60 has an internal screw thread suitable for receiving therein the threaded clevis mount 67. The clevis 65 is equipped to receive the vertical pin 66. The tube 60 at the point threaded for the clevis end 67 in split longitudinally and is provided with a conventional pinch collar 68 so as to tightly retain the clevis therein after necessary adjustments have been made. While not shown in the drawings, a simple lock-nut may be mounted on the threaded end 67 of the clevis 65 to secure its position in the tube 60.

The steering arm portion 70, which is also a part of the flexible steering arm or link member, has a forward end which is drilled or is provided with an eyelet to flexibly engage the vertical pin 66 of the aforementioned clevis 65. This arm portion 70 also extends back to the stub axle 50 of the front wheel 35 on the rear vehicle 19. The rear end of the steering arm portion 70 has a horizontal collar 71 integral therewith suitable for receiving the axle attachment hereinafter described in detail.

The axle attachment which acts as a mounting means for the arm 70 consists of; first, an internally threaded bushing 51 which engages the threaded end 50a of the non-rotating stub axle 50 of a steerable, front, vehicle wheel. This bushing 51 is about two inches longer than the threaded end 50a and therefore extends outward slightly beyond the end of the axle. The bushing 51 is also split longitudinally and is provided with a pinch collar 52 which makes a tight and rigid connection with the axle 50.

Next, the stud bolt 53 is tightly screwed into the threaded bushing 51 so that the abutting ends of the axle portion 50a and the stud bolt 53 touch. The stud bolt 53, in addition to providing a threaded end for the lock-nut 54, also supplements the pinch collar 52 in locking the bushing 51 to the axle 50.

The collar portion of the steering arm 70 is placed over the outer end of the bushing 51 and is retained thereon by the lock-nut 54 and the washer 55 and the cotter pin 56. The collar portion 71 fits just loose enough so as to permit the arm member 70 to swivel on or freely rotate around the bushing 51. As the stub axle 50 does not rotate and as the movement of the arm 70 is limited to a very small radius, there is little likelihood of the aforementioned axle attachment parts becoming disassembled while in use.

The part 70 of the flexible steering member curves inward slightly at its forward end so as to bring the pin 66 of the clevis 65 about in line with the center of the tread of the tire. The arm 70 also, if necessary, may be projected downward slightly so as to enable the steering link and guide arm members to clear the lower edge of the bumper 20. The clevis 65 itself is made rather substantial in order to uphold the portions 60 and 70 which members it links together.

The best performance of the instant device is obtained when imaginary straight lines connecting the four points represented by vertical pin 25, the king-pin 49, the ball 61, and the clevis pin 65 form a parallelogram. Therefore, when using the device the steering member tube 60 and the clevis member 67 therein are adjusted by expansion or contraction so as to make a figure as near to a parallelogram as possible. As different makes of automobiles vary in structure, and as some stub axles are shorter than others, or because their two front king-pins are closer together, some additional adjustment may be made by shifting the position of the bracket 27 on the draw-bar beam 21. For that purpose a series of spaced horizontally extending holes may be drilled in the beam 21. This manner of adjustment is not illustrated in detail in the drawings as anyone skilled in the art may readily provide for such assembly. In practice, it has been found that for limited towing of passenger vehicles other than buses all adjustments for practical, temporary purposes may be easily and quickly made by extending or retracting the clevis member 67.

As it is desirable to retain through the entire use and operation of the device as much of the aforementioned parallelogram formation as possible; and as the intermittent flexing of the bumper 20 would tend to upset or destroy the geometric formation, certain braces are provided which make a substantially rigid connection to the rear vehicle chassis. The brace members hereinafter described tend to prevent unnecessary wear on the vehicle tires otherwise caused by the vibrating movement of the bumper and the draw-bar members.

The brace members consist of two strips of hard, rigid metal herein referred to as bars 80 and 81 each of which is provided or drilled with equally spaced holes at their respective ends. The bar 80 extends radially, rearward and sidewise from the pivot pin 25 to the fork of the bumper bracket members 82 and 83 on the left side of the vehicle 19, and the bar 81 extends similarly to the bracket on the right side frame member of the vehicle 19. These bars are attached to the top portion of the clamp member 22 and extend over the top edge of the bumper 20.

As the bumper 20, with which this device is intended to be used, is mounted on V type brackets, the spreading bracket arms 82 and 83 form very suitable mounts for the outer ends of the bars 80 and 81. Extending vertically between the bracket arms 82 and 83, somewhat close to where the two arms come together, there is a machine bolt 84. This machine bolt 84 is a little longer than the width of the said arms 82 and 83. A pair of co-related washers indicated by the characters 85 and 86 engage the upper edges of the bumper bracket arms 82 and 83, and similarly another pair of washers 85a and 86a engage the lower edges of the bumper bracket arms 82 and 83.

The two top co-related washers 85 and 86 are each provided with downwardly extending tabs 87 and 88 and the two bottom co-related washers are similarly provided with upwardly extending tabs 87a and 88a. The tabs 87 and 88, 87a and 88a contact the outer surfaces of the bracket arms 82 and 83. Both pairs of co-related washers are made with corrugated contacting surfaces 89; so that they, after being set in the desired position, cannot turn with respect to each other or move with respect to the bracket arms 82 and 83. The corrugations 89 are simply a plurality of radially extending, interlocking, regularly spaced ridges and grooves. All the washers have central holes therein suitable for the insertion of the machine bolt 84.

In assembling the device, after the draw-bar and automatic steering device is connected to the vehicles in tandem, the top pair of washers 85 and 86 is first placed on the bumper bracket arms 82 and 83 so that the tabs 87 and 88 each engage one of the arms; secondly, the ends of the upper bars 80 and 81 are placed over the washers 85 and 86 with the holes of each bar coinciding; thirdly, the bolt 84 is inserted therethrough so that its threaded end extends below and between the arms 82 and 83; next, the bottom washers 85a and 86a are slipped over the bolt so that their respective upwardly extending tabs 87a and 88a engage the bottom edges of the bracket arms 82 and 83; and finally, after the forward ends of the brace bars 80 and 81 have been connected to the clamp member 22, all the parts are firmly locked together by the nut 84a and the lock washer 84b.

By reason of the corrugations 89 on the washers, the bolt 84 can be rigidly locked in the fork of the two arms 82 and 83 and in a position corresponding to the spacing required by the two holes in the bars 80 and 81. The tabs 87 and 88 or 87a and 88a may be spread or closed to fit the particular structure on hand and altogether a firm, strong and rigid link is formed by the draw-bar member 21 and the rear vehicle chassis 19.

It will now be clear that there is provided by this invention an automatic tow-bar which accomplishes the objects heretofore set forth. While the invention has been described in a specific form and while certain general terms and special language have been used, it is to be understood that the embodiment of the invention as described is suggestive only and is not to be considered in a limiting sense. It is to be further understood that there may be other forms or adaptations of the invention which will suggest themselves to persons familiar with the art and those modifications are also considered to be within the broad scope of the invention set forth as no limitations upon it are intended other than those imposed thereon by the breadth of the appended claims.

I claim:

1. In a vehicle towing and steering device, an axle attachment for the end of a stub axle, comprising a bushing having internal running thread engageable with the said axle, the said bushing being longer than the axle end and extending outwardly thereof, a locking means integral with the said bushing for securely engaging the axle end therein, a screw member engaging the internal running thread of the said bushing and also abutting the end of the said axle, a collar member having an arm integral therewith mounted on the said bushing and connected to the said towing device, a lock-nut on the said screw member retaining the collar member on the bushing, and a washer mounted on the screw member intermediate the said bushing and the said lock-nut.

2. In a vehicle towing and steering device, an axle attachment for the threaded end of an automobile front axle, comprising in combination, a bushing member engageable with the said axle threaded end, a means for locking the bushing thereon, a collar member including an arm of the said steering device and engageable with the bushing member, and means for retaining the collar member on the bushing.

3. In a vehicle towing and steering device, an axle attachment for the threaded end of an automobile front axle, comprising in combination, a bushing member engageable with the axle threaded end, a collar member including a steering arm and swivelly engageable with the bushing member, and means for retaining the bushing and the collar members on the said axle.

4. In a vehicle towing and steering device, an axle attachment for the threaded end of an automobile front axle, comprising in combination, a split bushing member including a pinch-collar mountable on the threaded end of the axle, a collar member having a steering arm thereon engageable with the bushing member, and a means for retaining the collar member on the said bushing member.

5. In a vehicle towing and steering device, an axle attachment for the threaded end of an automobile front axle, comprising in combination, an internally threaded bushing member mountable on the threaded end of the axle and having a locking device thereon for retaining the bushing and the axle in rigid engagement, a collar member swivelly engageable with the bushing member and having a steering arm integral therewith, and a threaded means for retaining the collar member on the bushing member.

6. In a vehicle towing and steering device, an axle attachment for the threaded end of an automobile front axle, comprising in combination, a bushing member including a split-collar at one end and having a threaded inner surface engaging the axle threaded end and a smooth outer surface, a collar member swivelly engageable with the smooth outer surface of the bushing member and having a steering arm integral therewith, a screw member engaging the inner surface of the bushing member, projecting outwardly therefrom and abutting the said axle threaded end, and a means mounted on the screw member engaging the bushing member at the end opposite the split-collar and retaining the collar member thereon.

7. In a vehicle towing and steering device, an axle attachment for the threaded end of an automobile front axle, comprising in combination, a bushing member having a threaded inner surface engaging the axle threaded end and having a smooth outer surface, a split-collar integral with the bushing member and having a pinch device thereon for locking the bushing member in rigid engagement with the said axle threaded end, a collar member engageable with the outer surface of the bushing member and abutting the said split-collar, a steering arm integral with the said collar member and connected to the said steering device, a screw member engaging the inner threaded surface of the bushing member, extending outwardly therefrom and abutting the said axle threaded end, and a retaining means mounted on the screw member engaging the bushing member and abutting the collar member at the end opposite the split-collar.

HARRY H. RODIN.